Patented Oct. 21, 1924.

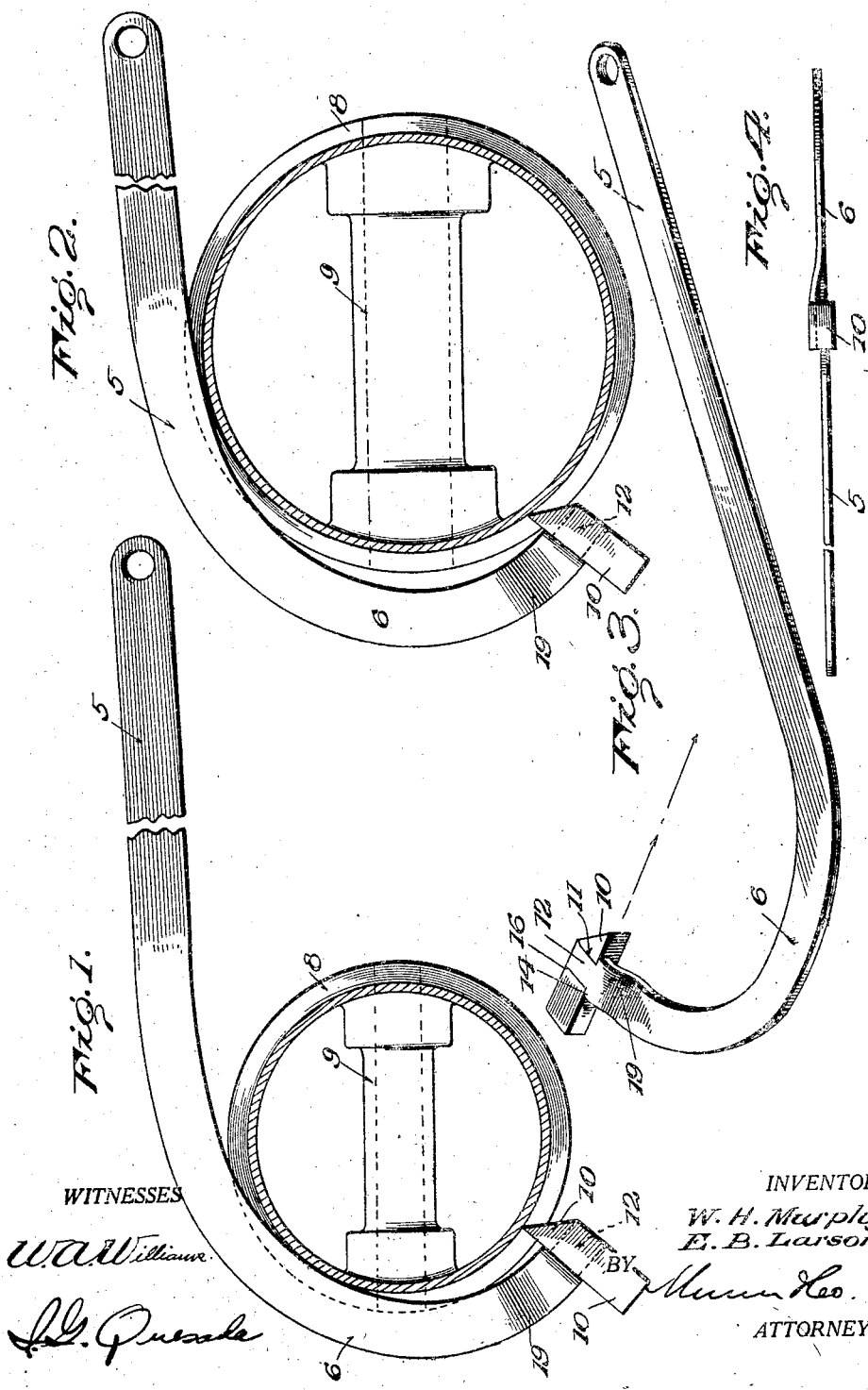

1,512,110

UNITED STATES PATENT OFFICE.

EDWIN B. LARSON AND WALTER H. MURPHY, OF SANISH, NORTH DAKOTA.

PISTON-GROOVE SCRAPER.

Application filed June 6, 1923. Serial No. 643,708.

*To all whom it may concern:*

Be it known that we, EDWIN B. LARSON and WALTER H. MURPHY, citizens of the United States, and residents of Sanish, in the county of Mountrail and State of North Dakota, have invented certain new and useful Improvements in Piston-Groove Scrapers, of which the following is a specification.

This invention relates to scrapers especially adapted for use in scraping carbon from piston ring grooves in pistons.

An important object is to provide a scraping device of the character specified, having simple means whereby the same, by one complete revolution, will completely remove the carbon in the piston ring groove of a piston and which is provided with a shank or stem by means of which the same is held in an operative position.

A further object is to provide a carbon scraping device which is simple to operate, durable in use and cheap to manufacture.

Other objects and advantages will be apparent during the course of the following description.

In the accompanying drawing forming a part of this application and in which like numerals are employed to designate like parts throughout the same;

Fig. 1 is a fragmentary plan view of the improved piston groove cleaner or scraper applied to a small piston;

Fig. 2 is a fragmentary plan view of the cleaner applied to a larger piston;

Fig. 3 is a perspective of the improved cleaner,

Fig. 4 is an edge elevation of the tool.

In the drawing, wherein for the purpose of illustration is shown a preferred embodiment of the invention, the numeral 5 designates a shank, the forward portion of which has the curve of a paraboloid as indicated at 6 and by reference to Figs. 1 and 2, it will be seen that the forward curved portion 6 of the shank is snugly received in the groove 8 of the piston 9 so as to steady and guide the scraping blades 10 secured to the forward portion of the shank.

The blade 10 is preferably attached to the forward portion of the shank by drop forging, or otherwise, and Fig. 3 illustrates that the blade 10 is formed with a transverse recess 11 for the reception of the reduced terminal portion 12 of the shank. The reduced portion 12 defines oppositely located shoulders 14 which flatly contact with the blade 10 on opposite sides of the transverse groove or recess 11. The forward portion of the attaching part 12 may be flared, as indicated at 16 so that the shank is securely and positively connected to the blade.

In carrying out the invention the forward end of the blade 10 is beveled to a sharp cutting edge which is engaged with the inner wall of the groove 8 so as to thoroughly remove the carbon in the groove.

It will be seen that the shank 5 is formed from a single length of flat metal and that the forward portion of the same is offset as indicated at 19 so that the cutter is disposed in the plane of the shank, and the pressure applied to the handle during the use of the device will be transmitted to the cutter and the tendency of the cutter to turn will be overcome.

As the forward portion 6 of the shank has the curve of a paraboloid, the tool may be used conveniently in connection with a small piston as illustrated in Fig. 1 or in connection with a larger piston as illustrated in Fig. 2 and in either case the beveled cutting edge of the cutter or blade is properly presented to the inner wall of the groove.

In use, the beveled cutting edge of the blade 10 is inserted into the piston ring groove and the intermediate portion of the shank is received within the groove whereby the device is guided in its rotation. In other words, the rigid shank 5 is snugly though slidable fitted in the groove of the piston so as to prevent the cutter from wabbling and to facilitate the cutting of the carbon from the walls of the groove. In this manner the blade is prevented from enlarging the original groove in the piston and consequently rendering the same too large for the piston ring.

In summarizing it will be seen that the invention consists of a rigid one-piece shank having its forward portion formed with the curve of a paraboloid and its intermediate portion rectangular in cross section and adapted to be snugly and slidably received in the piston ring groove so that the device is accurately guided.

It will be seen that the improved tool may be conveniently gripped by the hand of the operator without the possibility of pinching any part of the operator's hand, as the shank is formed from a single length of rigid metal.

Having thus described the invention, what is claimed is:—

1. A piston groove scraper comprising a single length of rigid metal having its forward portion provided with the curve of a paraboloid and having a reduced terminal and shoulders at opposite sides of the terminal, and a carbon scraping blade provided with a transverse recess to receive the reduced terminal, said shoulders being flatly engaged with the blade at opposite sides of said recess.

2. A piston groove scraper comprising a single length of rigid metal having its forward portion provided with the curve of a paraboloid and having a reduced terminal and shoulders at opposite sides of the terminal, and a carbon scraping blade provided with a transverse recess to receive the reduced terminal, said shoulders being flatly engaged with the blade at opposite sides of said recess, said length of metal having its forward portion offset whereby the blade is disposed in the plane of the length of metal.

EDWIN B. LARSON.
WALTER H. MURPHY.